April 7, 1953       W. F. SANDERS       2,633,741
ELECTRONIC NOISE DETECTOR

Filed Dec. 6, 1947                      3 Sheets-Sheet 1

Walter F. Sanders
INVENTOR.

April 7, 1953  W. F. SANDERS  2,633,741
ELECTRONIC NOISE DETECTOR
Filed Dec. 6, 1947  3 Sheets-Sheet 2
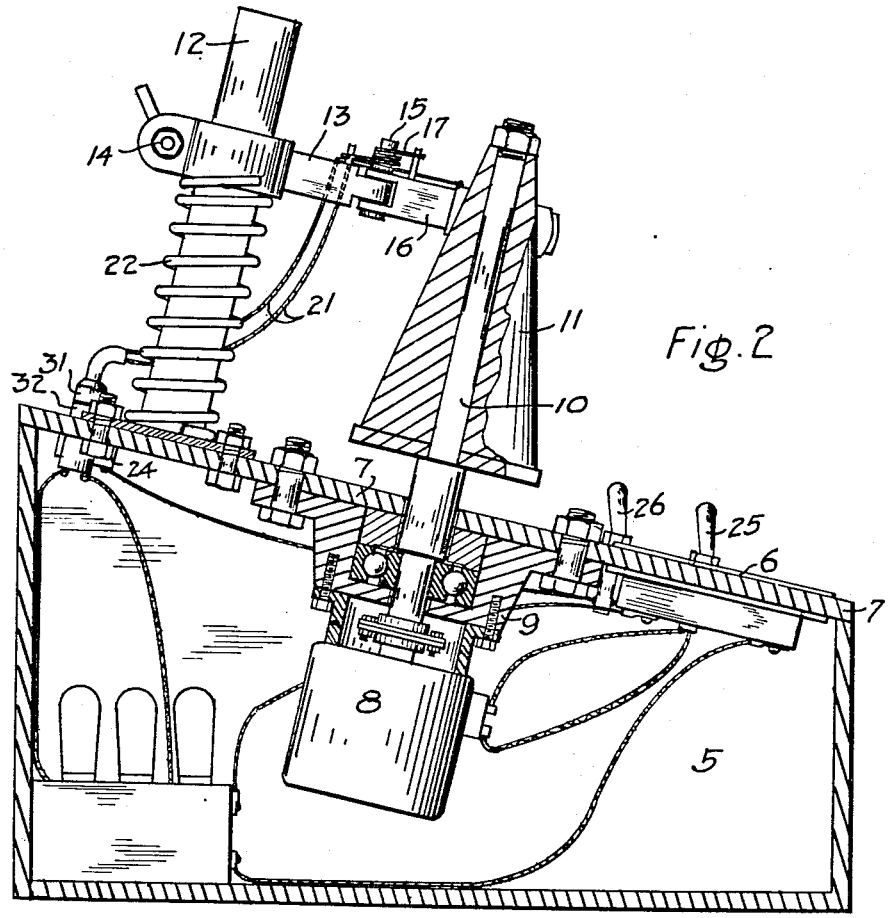
Fig. 2
Walter F. Sanders
INVENTOR.
BY 

Patented Apr. 7, 1953

2,633,741

UNITED STATES PATENT OFFICE 2,633,741

ELECTRONIC NOISE DETECTOR

Walter F. Sanders, Tacoma, Wash., assignor of one-half to Edward F. Lowe, Arcadia, Calif.

Application December 6, 1947, Serial No. 790,051

6 Claims. (Cl. 73—70)

This invention relates to devices for detecting the position and degree of noises such as are caused by imperfect fit of parts and developed in moving mechanism subject to wear, thereby facilitating the location of the defective or worn part.

The objects of my invention are, first, to provide means which may be placed in contact with a stationary or moving object and which will indicate on a scale the degree of vibration therein resulting from the operation of the object or the moving parts within the object; second, to provide such a means in which the indicating means may either be mounted in connection with the vibration exploring means, or the said exploring means may be removed and carried to a distance and only connected to the indicating means by wires; and third, to provide a multicolored index scale whereby the degree of allowable or rejectable noise may be seen at a glance without the detailed reading of the indicator on the scale.

I attain these and other objects as will readily and quickly be realized by those familiar with the art, by the devices, mechanism, electric circuits, connections and arrangements illustrated in the accompanying drawings, in which—

Figure 1:
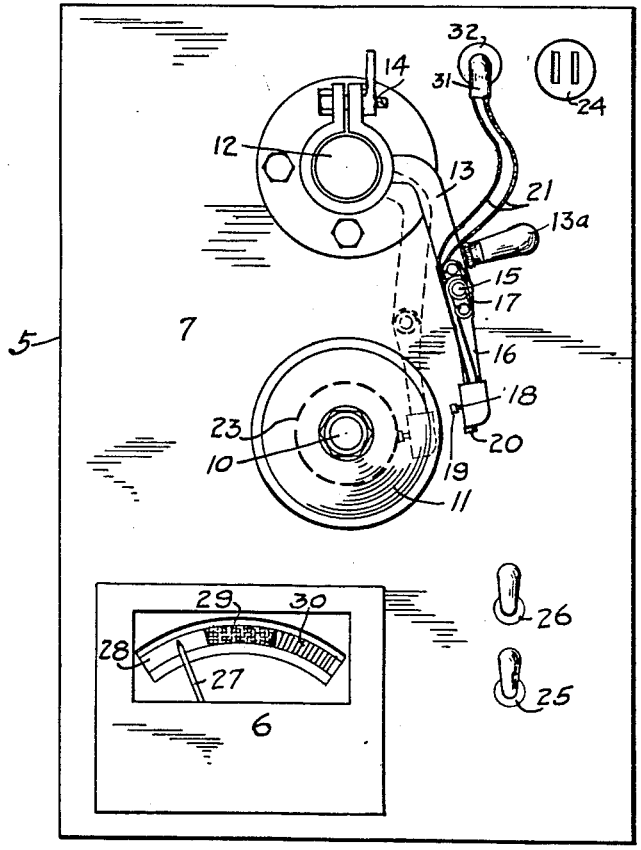
Figure 3:
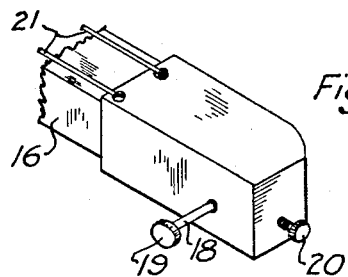
Figure 4:
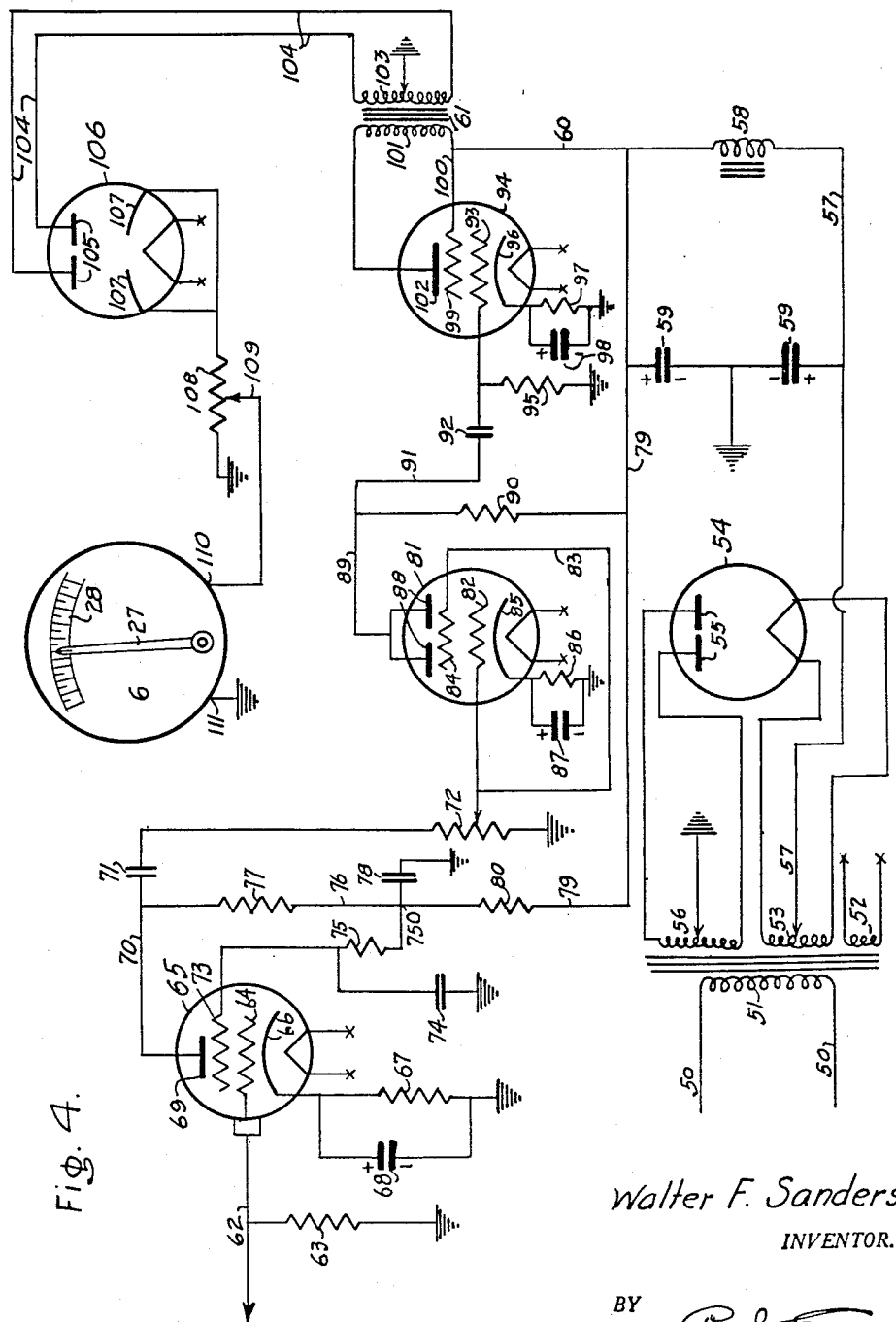

Fig. 1 is a plan view of the face of the box containing the apparatus as illustrated for investigating the condition of a ball- or roller-bearings; Fig. 2 is a vertical cross-section thereof; Fig. 3 is a view of the end of the exploring arm, showing especially the sensitive "needle" extending therefrom; and Fig. 4 is a wiring diagram of the electronic portion of the invention whereby the vibrations of the "needle" are indicated.

Identical numerals of reference refer to the same parts throughout the several views.

Wherever two parts are in contact with each other and are in relative motion there is friction, and wherever there is friction there is wear, and wherever there is wear there is vibration, and wherever there is vibration of sufficient degree there is noise. In some cases the noise comes within the capacity of the human ear to hear, and in other cases it is either too faint or of a rate of vibration too high or too low for the human ear to perceive, and in still other cases the transmitting medium has a dampening or deadening effect.

It is the purpose of my invention to provide means to detect the degree of vibration of such an object and thereby determine whether such vibration is insignificant or is too violent to be judged as an acceptable mechanism. The simplest form of my invention is illustrated in Figs. 1, 2 and 3 wherein it is arranged to detect the degree of vibration in ball- or roller bearings, but the same mechanism can be used for finding the place and cause of the vibration in other mechanism by removing the sensitive arm and lengthening the wires connecting the arm with the indicator, thus exploring the surface of the body to find the source of the vibration, and its extent.

As shown in the drawings I provide a box 5 wherein the electronic apparatus is mounted and containing an indicator 6 mounted in a suitable opening in the top plate 7 of the box 5 and visible by the operator, such indicator being, in this case, a commercial direct-current volt meter of suitable capacity.

A suitable electric motor 8 is also mounted within the box 5, being secured to a casting 9 fastened to the under side of the top plate 7. An extension shaft 10 passes through the said top plate 7 and is provided with a cone 11 secured thereto. This cone 11 is adapted to receive the ball bearing being tested, the inner race thereof coming in contact with and turning with the said cone 11, the outer race being held from rotation by the operator.

A post 12 is secured to the outer surface of the plate 7 and extends upward therefrom parallel with the axis of the shaft 10.

An arm 13 is loosely mounted on the post 12 but may be clamped in any position thereon by means of the clamp bolt 14. This arm 13 extends laterally from the post 12 and is provided with an elbow joint 15 connecting it to the exploring arm 16. A light spring 17 is coiled on the elbow joint 15 and engages the arms 13 and 16 to move the arm 16 towards the cone 11. This exploring arm 16 is provided with the sensitive needle 18, which is similar to a phonograph needle except that it is preferably provided with a flat contact head 19. The needle 18 is secured in the arm 16 by means of the clamp screw 20. When the apparatus is used to test the vibratory sounds of operating machinery the arm 13 is released from the post 12 and forms the handle whereby it is held and carried to the part to be tested.

The auxiliary handle 13a shown in Figure 1 secured to arm 13 adjacent the elbow joint 15 and projecting to the right may also be provided as additional means by which the unit may be held by the operator. In any event, the operator holds the unit by means of arm 13 and places the needle head 19 in contact with the machinery to be tested. Sufficient force is applied to arm 13 by the operator to bend the elbow joint 15 against the resistance of spring 17, whereby the needle head 19 is maintained in contact with the machinery at a substantially constant pressure.

The needle 18 is secured in the crystal pick-up device (not shown) mounted within the arm 16, and this pick-up is connected by the wires 21 to the electronic apparatus mounted in the box 5. A spring 22 may be mounted on the post 12 between the top plate 7 and the arm 13 to counterbalance the weight of the arms so that it may readily be slid on the post to bring the head 19 of the needle 18 into contact with the outer race of the bearing being tested, indicated by the circle 23 in Fig. 1. The light spring 17 functions to provide uniform and consistent pressure of the needle 18 against the bearing or other object being tested.

The electric power connection, both for the motor 8 and the electronic parts, is led to the outlet 24, and leads therefrom, in the box 5, to the switch 25 for the motor 8 and the switch 26 for the electronic connections hereinafter described.

The indicator 6 comprises a direct-current volt meter and is provided with a pointer 27 and a scale 28. Since the particular volts are not especially required, I have divided the said scale into three sections, the first thereof I have left untinted, but I color the middle section 29 amber, yellow or a similar color indicating caution, while the last section 30 is colored red, with the idea that when the pointer shows on the uncolored section the article being tested is to be considered perfect, if it shows on the sector 29 it is not perfect but passable, and if it shows on the sector 30 it is either rejected or the fault must be corrected.

The plug 31 of the pick-up wires 21 may either be inserted in the outlet 32 for direct connection with the electronic wires within the box 5, or an extension wire of any required length may be inserted between the parts 31 and 32 in order that the exploring arm 16 may be carried to any desired part of the machinery being tested for wear, while the box 5 with its electronic contents remains on the work bench, or elsewhere.

Referring, now, particularly to the wiring diagram illustrated in Fig. 4 which connects the alternating power current to the direct current voltmeter and which provides means for magnifying the effect of the vibrations on the readings of the voltmeter.

The 110 volt alternating circuit comes by the wires 50 to the main transformer 51, from which the alternating circuit 52, of 6 volts leads to all the 6-volt radio tubes to energize the filaments thereof, these circuits are not drawn on the diagram but the connections are indicated therein by the letters $xx$. A second circuit 53 of the transformer 51 is of five volts and leads directly to the filament of the 5-volt radio power rectifier tube 54 commercially known as "5Y3." The two plates 55 of this tube 54 are connected to another coil 56 of the transformer 51, said coil being centrally grounded. A power line wire 57 leads from the center of the 5-volt coil 53 to one terminal of the choke coil 58, across which a pair of electrolytic condensers 59, each of 8 microfarads, are connected, the negative sides being grounded. A wire 60 leads from the choke 58 to the amplifier transformer 61.

The electric vibrations caused by the vibrations of the needle 18, as above described, arrive at the electronic apparatus by the wire 62, which is grounded through a resistance 63 of one-half megohm, attached to the screen grid 64 of the pentode amplifier tube 65 (6SJ7). The cathode 66 of this tube is grounded through the resistance 67 of 5000 ohms, across which the electrolytic condenser 68, of 25 microfarads, is connected.

The plate 69 of the tube 65 is connected by the wire 70 to the 0.02 microfarad condenser 71 leading to the ground through the resistance 72, of one-half megohm. The other grid 73 of the tube 65 is connected to the ground through the 0.05 microfarad condenser 74 and through the resistance 75 of 0.05 megohm, to a junction 750 with a wire 76 joined to the above-described wire 70 through the resistance 77 of one-half megohm. This junction 750 is grounded through the condenser 78 of 0.05 microfarad. The junction 750 is also connected by the wire 79, through the resistance 80, of 0.05 megohm, with the power line 60.

The duotriode power amplifier tube 81 (6N7) has its first grid 82 adjustably connected to the above described grounded resistance 72 and by a wire 83 to the second grid 84 thereof. The cathode 85 of this tube 81 is grounded through the resistance 86 of 800 ohms, across which the electrolytic condenser 87, of 25 microfarads, is connected. The two plates 88 are connected by the wire 89, through the resistance 90, of 0.1 megohm, to the above described wire 79, and by a wire 91, through the condenser 92, of 0.02 microfarad, to the central grid 93 of the beam power amplifier tube 94 (6V6) and also to the ground through the resistance 95 of 0.25 megohm. The cathode 96 of the tube 94 is grounded through the resistance 97, of 700 ohms, across which the electrolytic condenser 98, of 25 microfarads, is connected. The other grid 99 of the tube 94 is connected by the wire 100 to the power line 60 and thus to one terminal of the primary coil 101 of the amplifier transformer 61. The plate 102 of the tube 94 is connected to the other terminal of the said transformer coil 101. The secondary coil 103 of the transformer 61 is centrally grounded and its two terminals are connected by the wires 104 to the plates 105 of the duodiode detector tube 106 (6H6). The two cathodes 107 of the tube 106 are both connected to the ground through a single resistance 108 of 0.5 megohm from which an adjustable shunt connection 109 leads to one terminal 110 of the direct current voltmeter 6 whose other terminal 111 is grounded.

The movement of the pointer 27 of this voltmeter 6 measures, on the scale 28, the variations in the current flowing through the tube 106, and such variations are in direct proportion to the variation in magnitude of the tone caused by the moving parts being investigated. Normally the part being tested gives out a steady, though often inaudible tone, and this tone is shown by the steady position of the pointer 27 on the scale 28.

The above description applies to the preferred form of the electronic apparatus, but it is evident that variations thereof may be used. In case the supplying current be a direct current instead of an alternating current, as shown, it is unnecessary to provide the rectifying means shown and the amplifying means and other connections would be changed accordingly.

Thus it will be seen that I have invented a mechanism which will "listen" to the noises in a machine and will indicate their intensity by the position of the pointer 27, and that while the box 5 may be on the garage work bench, the sensitive arm 16 with its needle 18 may be at a considerable distance therefrom and may be moved from point to point (noting the increase or decrease in the needle readings) to explore and thereby to locate the defective part.

It is, of course, understood that changes may be made in the details of the construction and wiring of my invention without departing from the spirit thereof, as outlined in the appended claims.

Having described my invention, what I claim and desire to secure by Letters Patent, is:

1. In an apparatus of the class described, a portable device comprising a handle section, an exploring arm section hinged thereto, a light spring connecting said handle and said arm section, a vibration sensitive apparatus on the end of said arm section and including a sensitive needle extending therefrom normal to the axis of the hinge connection with a flat contact head on the end of said needle and adapted to be lightly and firmly held in contact with a stationary member of an internally moving mechanism, through the pressure of said spring, to transmit the friction sounds generated therein to said vibration sensitive apparatus, said vibration sensitive apparatus generating an electric vibration; in combination with a fixed electronic apparatus, including a voltmeter adapted to measure the magnitude of the electric vibrations generated by the vibration sensitive apparatus; and flexible wires electrically connecting the exploring vibration sensitive apparatus to said electronic apparatus, whereby the electronic apparatus may be held stationary while the exploring arm is moved to investigate the friction sounds in various portions of the machinery.

2. In an apparatus of the class described, the combination of a driven shaft; a cone mounted on said shaft and adapted to receive the inner ring of a bearing to be tested, of any size within its capacity, and to cause said ring to rotate; a fixed post mounted adjacent to and parallel with said driven shaft; a support arm releasably secured on said post; an exploring arm jointed hingedly to said support arm, said exploring arm carrying a vibration sensitive apparatus at its end and having a needle with a flat head projecting normal to the axis of the hinge joint into radial contact with the outer ring of the bearing being tested; a light spring at the joint between said support arm and said exploring arm to attain a steady and firm contact of the needle head on the bearing; together with electronic apparatus connected by wires with the vibration sensitive apparatus and adapted to measure the magnitude of the vibrations picked up by the vibration sensitive apparatus.

3. An apparatus as set forth in claim 2, together with a clamp carried by said support arm and adapted to releasably secure the support arm in adjusted position longitudinally and rotationally on said post.

4. An apparatus as set forth in claim 2, together with means for counterbalancing said support arm and exploring arm, on said post.

5. A portable noise detector comprising a handle section, an exploring arm section hinged thereto, a light spring connecting the handle and arm sections, a vibration sensitive needle extending from the end of the arm section normal to the axis of the hinge and adapted to be held lightly and firmly in contact with a vibrating member to be tested through the pressure of the spring, pick-up means connected to the needle to produce electric impulses from the vibrations of the needle, and meter means connected electrically to the pick-up means and adapted to measure the magnitude of vibrations impressed upon said needle.

6. A noise detector comprising, in combination, a driven shaft, means on the shaft for supporting an article to be tested, a support arm releasably secured for adjustment adjacent the driven shaft, an exploring arm mounted pivotally upon the support arm, a light spring connecting the support arm and the exploring arm, a vibration sensitive needle extending from the end of the exploring arm normal to the axis of the pivot and adapted to be held lightly and firmly in contact with the article to be tested through the pressure of the spring, pick-up means connected to the needle to produce electric impulses from the vibrations of the needle, and meter means connected electrically to the pick-up means and adapted to measure the magnitude of vibrations impressed upon said needle.

WALTER F. SANDERS.

REFERENCES CITED

The following references are of record in the file of this patent:

UNITED STATES PATENTS

| Number | Name | Date |
| --- | --- | --- |
| 2,009,997 | Germond | Aug. 6, 1935 |
| 2,248,653 | Allendorff | July 8, 1941 |
| 2,340,714 | Traver et al. | Feb. 1, 1944 |
| 2,403,999 | Read et al. | July 16, 1946 |
| 2,404,143 | Reason | July 16, 1946 |
| 2,405,059 | Sahmel | July 30, 1946 |
| 2,427,364 | McKendry | Sept. 16, 1947 |
| 2,468,648 | Abbott et al. | Apr. 26, 1949 |

FOREIGN PATENTS

| Number | Country | Date |
| --- | --- | --- |
| 175,311 | Great Britain | Feb. 13, 1922 |
| 645,132 | Germany | June 27, 1936 |

OTHER REFERENCES

Article, "Noise in Industry," by H. H. Scott, published in "Instruments," September 1937, pages 231–236.